(12) United States Patent
Kano et al.

(10) Patent No.: US 11,075,397 B2
(45) Date of Patent: Jul. 27, 2021

(54) BIPOLAR SECONDARY BATTERY

(71) Applicant: NISSAN MOTOR CO., LTD., Yokohama (JP)

(72) Inventors: Gentaro Kano, Kanagawa (JP); Kazuki Arihara, Kanagawa (JP); Atsushi Horai, Kanagawa (JP); Eiji Minegishi, Kanagawa (JP); Takashi Mori, Kanagawa (JP); Yusuke Emori, Kyoto (JP); Yusuke Nakashima, Kyoto (JP)

(73) Assignee: NISSAN MOTOR CO., LTD., Yokohama (JP)

( * ) Notice: Subject to any disclaimer, the term of this patent is extended or adjusted under 35 U.S.C. 154(b) by 0 days.

(21) Appl. No.: 16/611,900

(22) PCT Filed: Apr. 26, 2018

(86) PCT No.: PCT/JP2018/017017
§ 371 (c)(1),
(2) Date: Nov. 8, 2019

(87) PCT Pub. No.: WO2018/207643
PCT Pub. Date: Nov. 15, 2018

(65) Prior Publication Data
US 2020/0388875 A1  Dec. 10, 2020

(30) Foreign Application Priority Data

May 10, 2017  (JP) .............................. JP2017-094061

(51) Int. Cl.
*H01M 10/04* (2006.01)
*H01M 4/66* (2006.01)
(Continued)

(52) U.S. Cl.
CPC ........... *H01M 10/04* (2013.01); *H01M 4/667* (2013.01); *H01M 4/668* (2013.01);
(Continued)

(58) Field of Classification Search
CPC ........ H01M 10/04; H01M 2/16; H01M 4/668; H01M 4/667; H01M 2/26; H01M 4/131; H01M 2004/021; H01M 2004/029
See application file for complete search history.

(56) References Cited

U.S. PATENT DOCUMENTS

| 2011/0039161 | A1 | 2/2011 | Torata et al. | |
| 2013/0022865 | A1* | 1/2013 | Nishinaka | H01M 4/668 429/211 |
| 2013/0295432 | A1* | 11/2013 | Inoue | H01B 13/0036 429/149 |

FOREIGN PATENT DOCUMENTS

| JP | 2009-252548 A | 10/2009 |
| JP | 2011-034891 A | 2/2011 |

(Continued)

*Primary Examiner* — Andrew J. Oyer
(74) *Attorney, Agent, or Firm* — Foley & Lardner LLP

(57) ABSTRACT

The bipolar secondary battery includes a power generation element including unit power generation elements stacked together and including bipolar electrodes stacked via separators, and current collecting plates arranged at both ends of the power generation element in the stacked direction of the unit power generation elements so as to be in contact with the power generation element, wherein the current collecting plates each include an electrically conductive layer and a resin film, the electrically conductive layer being formed on the resin film having a thermal shrinkage percentage of 2% or greater at a temperature of 150° C., and the separators have a higher thermal shrinkage start temperature than the resin films.

5 Claims, 2 Drawing Sheets

(51) Int. Cl.
*H01M 50/409* (2021.01)
*H01M 50/531* (2021.01)
*H01M 4/131* (2010.01)
*H01M 4/02* (2006.01)

(52) U.S. Cl.
CPC ....... *H01M 50/409* (2021.01); *H01M 50/531* (2021.01); *H01M 4/131* (2013.01); *H01M 2004/021* (2013.01); *H01M 2004/029* (2013.01)

(56) References Cited

FOREIGN PATENT DOCUMENTS

| | | |
|---|---|---|
| JP | 2016-146270 A | 8/2016 |
| JP | 2018-098206 A | 6/2018 |
| WO | WO 2009/131184 A1 | 10/2009 |
| WO | WO 2010/016432 A1 | 2/2010 |

\* cited by examiner

BIPOLAR SECONDARY BATTERY

TECHNICAL FIELD

The present invention relates to a bipolar secondary battery.

BACKGROUND ART

Electric vehicles (EV) and hybrid electric vehicles (HEV) have been developed so as to deal with an increase in environmental protection movement. Motor-driving electric devices such as chargeable/dischargeable secondary batteries are preferably used as power sources for driving motors of these types of vehicles. The demand for lithium ion secondary batteries contributing to high capacity and high output performance has grown, and the development is proceeding rapidly.

Bipolar secondary batteries are conventionally known as an example of lithium ion secondary batteries. A bipolar secondary battery includes plural sets of power generation units stacked, each unit including a positive electrode layer, a solid electrolyte layer, and a negative electrode layer stacked together. Bipolar layers are interposed between the stacked power generation units (power generation elements), and current collecting plates are arranged on the outermost layers of the stacked power generation units, all of these elements being housed in a battery case (Patent Document 1).

CITATION LIST

Patent Literature

Patent Document 1: Japanese Unexamined Patent Application Publication No. 2009-252548

SUMMARY OF INVENTION

The conventional technology still has a problem of a decrease in performance of the battery if an electrical conductor penetrates an exterior body such as a battery case to cause an internal short circuit, since a short-circuit current is allowed to keep flowing via the current collecting plates due to a contact between the electrical conductor and the current collecting plates located on the outermost layers.

To solve the above problem, the object of the present invention is to provide a secondary battery capable of avoiding a flow of a short-circuit current in the secondary battery via current collecting plates if an electrical conductor penetrates an exterior body.

The present invention for achieving the above object provides a bipolar secondary battery including bipolar electrodes. The bipolar secondary battery includes a power generation element including unit power generation elements stacked together and including the bipolar electrodes stacked via separators, and current collecting plates arranged at both ends of the power generation element in a stacked direction of the unit power generation elements so as to be in contact with the power generation element. Each of the current collecting plates includes an electrically conductive layer and a resin film, and the electrically conductive layer is formed on the resin film having a thermal shrinkage percentage of 2% or greater at a temperature of 150° C., and each of the separators has a higher thermal shrinkage start temperature than the resin film.

Advantageous Effects

The present invention can prevent a short-circuit current from flowing through the electrical conductor via the current collecting plates if the electrical conductor penetrates the exterior body and is stuck in the power generation element.

DESCRIPTION OF EMBODIMENTS

Figure 1:
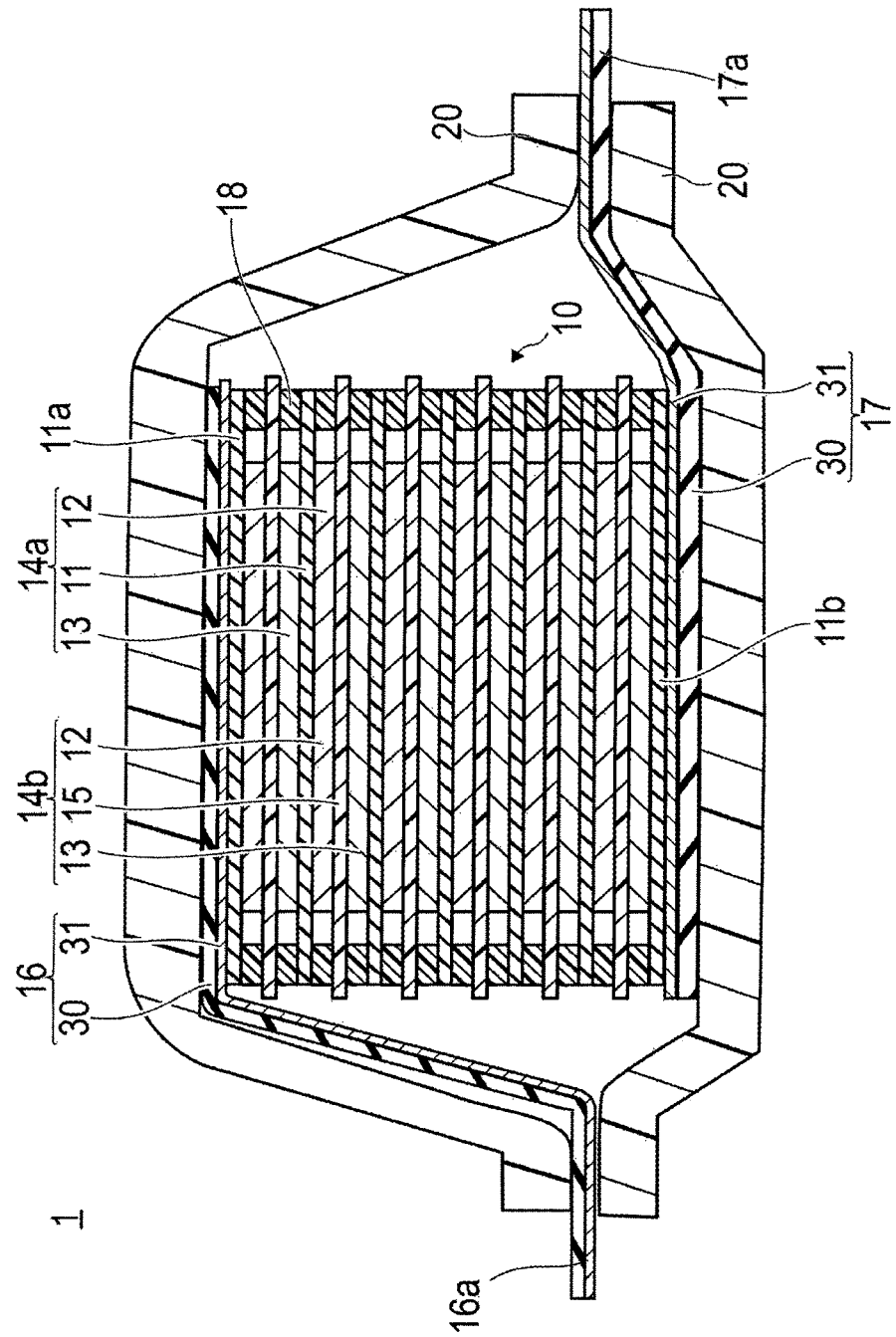
FIG. 1 is a cross-sectional view schematically showing an entire structure of a secondary battery according to an embodiment of the present invention.

An embodiment of the present invention will be described below with reference to the appended drawings. The same elements illustrated in the drawings are indicated by the same reference numerals, and overlapping explanations are not repeated below. The dimensions of the elements in the drawings may be exaggerated for illustration purposes, and are not necessarily drawn to scale.

A bipolar secondary battery (hereinafter simply referred to as a "secondary battery") according to the embodiment of the present invention is described below.

FIG. 1 is a schematic view showing the entire structure of the secondary battery according to the embodiment of the present invention.

As shown in FIG. 1, the secondary battery 1 has a structure in which a power generation element 10 executing charge and discharge is sealed in an exterior body 20.

(Entire Structure)

The power generation element 10 includes a plurality of bipolar electrodes 14a stacked on one another via separators 15, each bipolar electrode 14a including a positive electrode 12 provided on one surface of a sheet-like current collector 11, and a negative electrode 13 provided on the other surface opposite to the one surface. A single cell layer (unit power generation element) 14b includes the positive electrode 12 arranged on one surface of the separator 15, and the negative electrode 13 arranged on the other surface of the separator 15. The power generation element 10 thus includes the plural single cell layers 14b stacked on one another via the current collectors 11.

The secondary battery 1 has a structure in which the respective single cell layers 14b are electrically connected in series such that the positive electrodes 12 and the negative electrodes 13 are alternately stacked with the current collectors 11 interposed therebetween. The number of the single cell layers 14b to be stacked is determined as appropriate, and can be regulated depending on the preferred output voltage.

The embodiment illustrates the current collectors 11, particularly including one of the outermost current collectors on the positive electrode side of the secondary battery 1, which is referred to as a "positive-electrode-side outermost current collector 11a", and the other outermost current collector on the negative electrode side of the secondary battery 1, which is referred to as a "negative-electrode-side outermost current collector 11b".

The positive-electrode-side outermost current collector 11a is bonded to a positive-electrode-side current collecting plate 16 serving as an electrode (positive electrode) of the entire power generation element 10. The negative-electrode-side outermost current collector 11b is bonded to a negative-electrode-side current collecting plate 17 serving as an electrode (negative electrode) of the entire power generation element 10. The positive-electrode-side outermost current collector 11a and the negative-electrode-side outermost current collector 11b are not limited to the above configurations, and may be bonded to the positive-electrode-side current collecting plate 16 and the negative-electrode-side current collecting plate 17, respectively, via a particular layer (such as a positive electrode active material layer or a negative electrode active material layer).

(Current Collecting Plate)

The positive-electrode-side current collecting plate 16 is in contact with the power generation element 10 and is electrically connected thereto on one of the outermost layers to which the positive electrode 12 faces in the stacked direction of the single cell layers 14b. The positive-electrode-side current collecting plate 16 is led out of the exterior body 20 to serve as a positive electrode tab 16a.

The negative-electrode-side current collecting plate 17 is in contact with the power generation element 10 and is electrically connected thereto on the other outermost layer to which the negative electrode 13 faces in the stacked direction of the single cell layers 14b. The negative-electrode-side current collecting plate 17 is led out of the exterior body 20 to serve as a negative electrode tab 17a.

The positive-electrode-side current collecting plate 16 and the negative-electrode-side current collecting plate 17 (hereinafter referred to as the current collecting plates 16 and 17) each also serve as a heavy electrical tab to extract current from the power generation element 10 to the outside during discharge, and receive external current during charge. The positive electrode tab 16a and the negative electrode tab 17a are electrically connected to an external load (such as a motor) or a generator, for example, so as to charge and discharge the secondary battery 1.

The respective current collecting plates 16 and 17 have the same structure in which an electrically conductive layer 31 is formed on a resin film 30 serving as a substrate. The current collecting plates 16 and 17 are arranged on both sides of the power generation element 10 in the stacked direction of the single cell layers 14b so as to be in contact with the power generation element 10. The current collecting plates 16 and 17 are each arranged such that the surface of the electrically conductive layer 31 is in contact with the power generation element 10.

The resin film 30 used has a thermal shrinkage percentage of 2% or greater at a temperature of 150° C. The thermal shrinkage percentage of the resin film 30 is a value indicating how the dimension changes (is reduced) when the film material is heated. The resin film 30 does not necessarily have the upper limit of the thermal shrinkage percentage, which may be set to 100% at 150° C. or higher at which the resin film 30 is to be melted. The thermal shrinkage percentage of the resin film 30 is measured in accordance with JIS K7133-1999: Plastics—Film and sheeting—Determination of dimensional change on heating.

Examples of material (polymer material) used for the resin film 30 include polyethylene (PE) (such as high-density polyethylene (HDPE) and low-density polyethylene (LDPE)), polypropylene (PP), polystyrene (PS), polyethylene terephthalate (PET), polyether nitrile (PEN), polyvinyl chloride (PVC), polyvinylidene fluoride (PVdF), polyvinylidene chloride (PVDC), and a mixture of these materials. The thermal shrinkage percentage is regulated such that a length or a polymerization degree of a polymer chain of these polymer materials is changed, for example. The present invention is not limited to these materials, and may use any material that fulfills the thermal shrinkage percentage described above.

The electrically conductive layer 31 is formed from a material mainly including metal. Examples of metal include aluminum (Al), gold (Au), silver (Ag), copper (Cu), iron (Fe), platinum (Pt), chromium (Cr), tin (Sn), indium (In), antimony (Sb), titanium (Ti), and nickel (Ni). Two or more of these metals may be combined together. An alloy such as stainless steel (SUS) may also be used. Any other electrically conductive substance such as carbon may be used instead of metal.

The respective current collecting plates 16 and 17 in which the electrically conductive layer 31 is formed on the resin film 30 have sheet resistance set to 0.1 Ω/sq or lower. The current collecting plates 16 and 17 may have any lower limit of the sheet resistance, which is preferably as low as possible.

The respective current collecting plates 16 and 17 may have any thickness, which may be either substantially the same as or greater than that of the current collectors described below. For example, the thickness (the entire thickness of the resin film and the electrically conductive layer) is set in a range of about 1 μm to 300 μm. The thickness of each electrically conductive layer 31 is set to a range which fulfills the above sheet resistance. For example, the thickness of each electrically conductive layer 31 is preferably set in a range of about 0.1 μm to 20 μm. The thickness set to this range can ensure electrical conductivity for the respective current collecting plates 16 and 17 sufficient to bring out the performance of the secondary battery. The thickness of each electrically conductive layer 31 set to the above range can allow the electrically conductive layer 31 to deform together with the resin film 30 without hindrance to shrinkage of the resin film 30 if an electrical conductor described below penetrates the exterior body of the secondary battery. The current collecting plates 16 and 17 each including the resin film 30 provided with the electrically conductive layer 31 thus entirely shrinks when being heated.

The electrically conductive layer 31 may be formed on the resin film 30 by a method such as printing (particularly screen printing or inkjet printing), plating, or sputtering.

The electrically conductive layer 31 is illustrated with the case of being provided only on one surface of the resin film 30, but may be arranged on both surfaces of the resin film 30.

Alternatively, the respective current collecting plates 16 and 17 may be formed from electrically conductive resin, for example, instead of the combination of the resin film 30 and the electrically conductive layer 31 formed thereon. The electrically conductive resin used as the respective current collecting plates 16 and 17 also has a thermal shrinkage percentage set to 2% or greater at a temperature of 150° C. A resin matrix to be used may be a material equivalent to the resin material described above. Examples of electrically conductive filler mixed with the resin matrix include the metal materials described above and carbon. In particular, the current collecting plates using the electrically conductive resin are formed so as to have a thermal shrinkage percentage set to 2% or greater at 150° C., and a sheet resistance of 0.1 Ω/sq or lower, which are the same as those of electrically conductive resin used for the current collectors described below. The thickness of the current collecting plates using the electrically conductive resin can be substantially the same as that of the current collectors, and may be set in the range of 1 µm to 300 µm, for example.

(Current Collector)

The current collectors 11, 11a, and 11b (including the outermost current collectors 11a and 11b when simply referred to as "current collectors 11") may be formed from electrically conductive resin. The current collectors 11 using the electrically conductive resin are each a resin current collector (also referred to as "current collecting foil") including a resin matrix of polymer material and electrically conductive filler (electrically conductive particles).

Examples of polymer material used as the resin matrix include polyethylene (PE) (such as high-density polyethylene (HDPE) and low-density polyethylene (LDPE)), polypropylene (PP), polystyrene (PS), polyethylene terephthalate (PET), polyether nitrile (PEN), polyimide (PI), polyamide (PA), polyamideimide (PAI), polytetrafluoroethylene (PTFE), styrene-butadiene rubber (SBR), polyacrylonitrile (PAN), polymethyl acrylate (PMA), polymethyl methacrylate (PMMA), polyvinyl chloride (PVC), polyvinylidene fluoride (PVdF), polyvinylidene chloride (PVDC), and a mixture of these materials. These materials have quite a wide potential window, are stable with respect to both positive electrode potential and negative electrode potential, and are light in weight, so as to contribute to a high output density of the secondary battery. Particularly preferable examples include various kinds of polyolefin such as polypropylene and polyethylene, a copolymer thereof, and a mixture thereof, in view of durability with respect to an electrolysis solution to be used.

The electrically conductive filler is selected from materials having electrical conductivity. The material used preferably has no ion conductivity in order to prevent ions from being transmitted through the current collectors 11.

Specific examples include carbon material, aluminum (Al), gold (Au), silver (Ag), copper (Cu), iron (Fe), platinum (Pt), chromium (Cr), tin (Sn), indium (In), antimony (Sb), titanium (Ti), and nickel (Ni), but the electrically conductive filler is not limited to these materials. These materials may be independently used for the electrically conductive filler, or two or more thereof may be combined together. An alloy of these materials such as stainless steel (SUS) may be used instead. The electrically conductive filler is preferably Al, SUS, carbon material, or Ni, and more preferably carbon material or Ni, in view of resistance to corrosion. These types of electrically conductive filler may be provided such that particulate ceramic material or resin material is plated and coated with the above metal.

An example of the above carbon material is at least one kind selected from the group consisting of acetylene black, carbon black, Vulcan (registered trademark), Black Pearls (registered trademark), carbon nanofiber, Ketjenblack (registered trademark), carbon nanotube, carbon nanohorn, carbon nanoballoon, hard carbon, and fullerene. These types of carbon material have quite a wide potential window, are stable with respect to both positive electrode potential and negative electrode potential in a wide range, and have high electrical conductivity. Since the carbon material is quite light in weight, the increase in mass is minimized Such carbon material is frequently used as an supplementary electric conducting additive for electrodes, and contact resistance thus can be reduced if the carbon material is brought into contact with the supplementary electric conducting additive, since these are the same kinds of material. When the carbon material is used for the electrically conductive filler, the surface of the carbon material is subjected to hydrophobic treatment to decrease permeation of an electrolyte, so as to avoid penetration of the electrolyte into pores in the current collectors 11.

When the secondary battery 1 according to the present embodiment is a lithium ion secondary battery, and charge/discharge potential of a negative electrode active material is close to deposition potential of Li, the use of the electrically conductive filler such as carbon material may cause intercalation of Li ions during the charge and discharge to lead to swelling, causing the current collectors 11 to be damaged (leading to a break in the current collectors 11) accordingly. In view of this, the electrically conductive filler used for the current collectors 11 facing the negative electrodes is preferably the material such as Ni, Cu, Fe, and SUS so as not to cause the intercalation of Li. Alternatively, the electrically conductive filler including the carbon material covered with these materials is also preferable.

The shape of the electrically conductive filler may be appropriately determined and selected from any conventionally-known shape, such as a particulate shape, a powdery shape, a fibrous shape, a plate-like shape, a lump shape, a fabric-like shape, or a mesh-like shape. When the electrical conductivity should be imparted to a wide area, the electrically conductive filler having a particulate shape is preferably used. When the electrical conductivity should be improved in a particular direction, the electrically conductive filler having a fibrous shape so as to provide directional characteristics is preferably used.

An average particle diameter (average particle diameter of primary particles) of the electrically conductive filler is preferably, but not necessarily, set in a range of about 0.01 µm to 10 µm, and more preferably in a range of about 00.1 µm to 1 µm. As used herein, the term "particle diameter" refers to the greatest length L between any two points on the circumference of the electrically conductive filler. The term "average particle diameter" refers to a value calculated as an average value of particle diameters of particles observed in several to several tens of fields of view by means of a scanning electron microscope (SEM) or a transmission electron microscope (TEM).

When the electrically conductive filler has a fibrous shape, an average fiber length is preferably, but not necessarily, set in a range of 0.1 µm to 100 µm. As used herein, the term "average fiber length" refers to a value calculated as an average value of fiber lengths of fibers observed in several to several tens of fields of view by means of a scanning electron microscope (SEM) or a transmission electron microscope (TEM). An average diameter of the electrically conductive filler having a fibrous shape is preferably, but not necessarily, set in a range of 0.01 µm to 1 µm.

The content of the polymer material in the respective current collectors 11 is preferably, but not necessarily, set in a range of 10 to 95 parts by mass, and more preferably in a range of 12 to 90 parts by mass, with respect to 100 parts by mass of the total content of the polymer material and the electrically conductive filler in the respective current collectors 11.

The content of the electrically conductive filler in the respective current collectors 11 is preferably, but not necessarily, set in a range of 5 to 90 parts by mass, and more preferably in a range of 10 to 88 parts by mass, with respect to 100 parts by mass of the total content of the polymer material and the electrically conductive filler in the respective current collectors 11. The content of the electrically conductive filler is also preferably regulated such that the sheet resistance of the respective current collectors 11 is set in a range of 0.1 Ω/sq or greater and 500 Ω/sq or less. The addition of the electrically conductive filler with the content set as described above to the polymer material can impart sufficient electrical conductivity to the respective current collectors 11 while avoiding an increase in mass of the respective current collectors 11.

The respective current collectors 11 may further include other additives in addition to the polymer material and the electrically conductive filler. Examples of other additives include carboxylic acid modified polypropylene such as maleic anhydride modified polypropylene. The content of the other additives is preferably, but not necessarily, set in a range of 1 to 25 parts by mass with respect to 100 parts by mass of the total content of the polymer material and the electrically conductive filler.

The surface of the polymer material to which the electrically conductive filler is added can be coated with epoxy resin to which electrically conductive filler is added. Such coating can decrease the thermal shrinkage percentage of the current collectors 11.

A thickness of the respective current collectors 11 is preferably set in a range of 1 μm to 200 μm, more preferably in a range of 3 μm to 150 μm, and still more preferably in a range of 5 μm to 100 μm. The respective current collectors 11 may have either a single-layer structure or a stacked structure in which layers formed from the materials described above are combined together.

A method of manufacturing the current collectors 11 is determined as appropriate. For example, the respective components of the polymer material and the electrically conductive filler, and the other additives as necessary, are melted and kneaded with an extruder, and the melted and kneaded material is then rolled with a heat pressing device.

The electrically conductive resin of this type has higher electrical resistivity than typical metal such as aluminum and copper. The current collectors 11 using the electrically conductive resin according to the present embodiment has the sheet resistance in the range of, for example, 0.1 Ω/sq or greater and 500 Ω/sq or less as described above. The electrical resistivity of aluminum is $2.82 \times 10^{-8}$ Ω·m, and the electrical resistivity of copper is $168 \times 10^{-8}$ Ω·m.

A current path of the respective current collectors 11 in the stacked direction is quite short since the current collectors 11 is thin. The use of the electrically conductive resin can avoid an influence on electronic conduction in the stacked direction if the current collectors 11 have slightly higher electrical resistance in the stacked direction (the thickness direction) than current collectors of metal. In contrast, since the current path of the respective current collectors 11 in the plane direction is long, the electrical resistance of the current collectors 11 is higher than the current collectors of metal. Such a configuration can prevent current from flowing toward the electrical conductor from the current collectors 11 when the electrical conductor penetrates the secondary battery (during a nail penetration test, for example).

The current collectors 11 may use electrically conductive material used for typical secondary batteries, instead of the electrically conductive resin. Examples of electrically conductive material include metal such as aluminum, copper, nickel, an alloy thereof, and stainless steel.

(Separator)

The separator 15 is interposed between the positive electrode 12 and the negative electrode 13 to electrically separate the positive electrode 12 from the negative electrode 13. The separator 15 holds an electrolysis solution between the positive electrode 12 and the negative electrode 13 so as to ensure the conductivity of ions.

The separator to be used has a thermal shrinkage start temperature which is higher than that of the resin film 30 used for the respective current collecting plates 16 and 17.

The separator 15 of this type may be a separator of a porous film (porous sheet) including polymer or fiber that absorbs and holds the electrolyte (electrolysis solution), or a nonwoven fabric separator.

An example of the separator 15 of a porous film including polymer or fiber may be a microporous material (microporous film).

In particular, the separator having a higher thermal shrinkage start temperature than the resin film 30 used for the respective current collecting plates 16 and 17, may be selected from microporous (microporous film) separators formed from hydrocarbon-based resin such as polyolefin such as polyethylene (PE) and polypropylene (PP), a laminated body including these materials repeatedly stacked on one another (for example, a laminated body having a three-layer structure of PP/PE/PP), polyimide, aramid, polyvinylidene fluoride-hexafluoropropylene (PVdF-HFP), or glass fiber.

A thickness of the microporous (microporous film) separator depends on the purpose, and cannot be unambiguously defined. For example, the thickness with either a single layer or multiple layers is preferably set in a range of 4 μm to 60 μm for the use of a secondary battery for driving a motor in a vehicle such as an electric vehicle (EV), a hybrid electric vehicle (HEV), and a fuel secondary battery vehicle (FCV). The greatest micropore diameter of the microporous (microporous film) separator is preferably 1 μm or smaller (the pore diameter is typically about several tens of nanometers).

The nonwoven fabric separator is formed from a conventionally known material such as cotton, rayon, acetate, polyimide, and aramid, which are used independently or mixed together. A bulk density of nonwoven fabric may be set to any value that can bring out the sufficient secondary battery properties due to the impregnated polymer gel electrolyte. A thickness of the nonwoven fabric separator is preferably set in a range of 5 μm to 200 μm, and particularly preferably in a range of 10 μm to 100 μm.

The separator 15 may also be a separator in which a heat resistant insulation layer is stacked on a substrate of a porous film (a heat resistant insulation layer-equipped separator). The heat resistant insulation layer is a ceramic layer including inorganic particles and a binder. The heat resistant insulation layer-equipped separator used is a high heat resistant separator having a melting point or a thermal softening point of 150° C. or higher, preferably 200° C. or higher.

The use of the heat resistant insulation layer reduces internal stress in the separator which increases as a temperature increases, so as to achieve the effect of preventing thermal shrinkage.

The heat resistant insulation layer-equipped separator entirely has a higher thermal shrinkage start temperature than the resin material itself due to the heat resistant insulation layer. The thermal shrinkage of the heat resistant insulation layer is also reduced to a small level.

The inorganic particles included in the heat resistant insulation layer contribute to mechanical strength and the thermal shrinkage prevention effect of the heat resistant insulation layer. A material used as the inorganic particles is determined as appropriate, and examples thereof include oxides ($SiO_2$, $Al_2O_3$, $ZrO_2$, and $TiO_2$), hydroxides, nitrides of silicon, aluminum, zirconium, and titanium, and complexes thereof. The inorganic particles may be material derived from a mineral source such as boehmite, zeolite, apatite, kaolin, mullite, spinel, olivine, and mica, or an artificially-manufactured substance. These inorganic particles may be used independently, or two or more thereof may be combined together. The inorganic particles used are preferably silica ($SiO_2$) or alumina ($Al_2O_3$), and particularly preferably alumina ($Al_2O_3$), in view of costs.

The weight of the heat resistant particles is preferably, but not necessarily, set in a range of 5 to 15 g/m². The weight set in the above preferable range can achieve sufficient ion conductivity and can also keep strength at high temperature.

The binder included in the heat resistant insulation layer binds the inorganic particles to each other, or binds the inorganic particles to the substrate of the resin porous film. The use of the binder contributes to the formation of the stable heat resistant insulation layer, and prevents separation between the porous substrate and the heat resistant insulation layer.

The binder used in the heat resistant insulation layer may be any compound, and examples of compounds include carboxymethylcellulose (CMC), polyacrylonitrile, cellulose, an ethylene-vinyl acetate copolymer, polyvinyl chloride, styrene butadiene rubber (SBR), isoprene rubber, butadiene rubber, polyvinylidene fluoride (PVDF), polytetrafluoroethylene (PTFE), polyvinyl fluoride (PVF), and methyl acrylate. The binder is particularly preferably carboxymethylcellulose (CMC), methyl acrylate, or polyvinylidene fluoride (PVDF). These compounds may be used independently, or two or more thereof may be combined together.

The content of the binder in the heat resistant insulation layer is preferably set in a range of 2% to 20% by weight with respect to 100% by weight of the heat resistant insulation layer. The content of the binder set to 2% by weight or greater can enhance the peeling strength between the heat resistant insulation layer and the porous substrate layer to improve damping performance. The content of the binder set to 20% by weight or less can ensure sufficient gaps between the inorganic particles, so as to achieve sufficient lithium ion conductivity.

(Electrolyte)

The electrolyte (electrolysis solution) is a non-aqueous electrolysis solution. The electrolysis solution allows ions to be transferred between the positive electrode 12 and the negative electrode 13, so as to charge/discharge the power generation element 10 with electricity. The electrolysis solution has a constitution in which lithium salt serving as supporting salt is dissolved in an organic solvent, for example. The organic solvent may be any solvent that can sufficiently dissolve the supporting salt and, for example, may be a plasticizer such as an aprotic solvent including at least one kind or two or more kinds mixed together, selected from the group consisting of: (1) cyclic carbonate such as propylene carbonate and ethylene carbonate; (2) chain carbonate such as dimethyl carbonate, methyl ethyl carbonate, and diethyl carbonate; (3) ether such as tetrahydrofuran, 2-methyltetrahydrofuran, 1,4-dioxane, 1,2-dimethoxyethane, and 1,2-dibutoxyethane; (4) lactone such as γ-butyrolactone; (5) nitrile such as acetonitrile; (6) ester such as methyl propionate; (7) amide such as dimethylformamide; and (8) methyl acetate and methyl formate. These organic solvents may be used independently, or two or more thereof may be mixed together. The supporting salt used can be conventionally known salt, such as $Li(C_2F_5SO_2)_2N$(LiBETI), $Li(CF_3SO_2)_2N$(LiTFSI), $Li(FSO_2)_2N$(LiFSI), $LiPF_6$, $LiBF_4$, $LiClO_4$, $LiAsF_6$, $LiCF_3SO_3$, $Li(CF_3SO_2)_2N$, and $Li(C_2F_5SO_2)_2N$.

(Positive Electrode and Negative Electrode)

The positive electrode 12 includes a positive electrode active material layer. The positive electrode 12 includes a positive electrode active material and an supplementary electric conducting additive, for example. The positive electrode 12 has a sheet-like shape having a predetermined thickness t1.

The positive electrode active material is a positive electrode material capable of accumulating and releasing a substance (ions) being transferred between the positive electrode 12 and the negative electrode 13 during the electrode reaction. Examples of positive electrode active materials include a composite oxide of lithium and transition metal (such as $LiCoO_2$, $LiNiO_2$, $LiMnO_2$, and $LiMn_2O_4$), a transition metal sulfate (such as $MoS_2$ and $TiS_2$), and an electrically conductive polymer (such as polyaniline, polyvinylidene fluoride, polypyrrole, polythiophene, polyacetylene, poly-p-phenylene, and polycarbazole).

The supplementary electric conducting additive is selected from materials having electric conductivity. Examples of supplementary electric conducting additives include metal such as aluminum, stainless steel (SUS), silver, gold, copper, and titanium, carbon such as graphite and carbon black, and a mixture thereof.

The negative electrode 13 includes a negative electrode active material layer. The negative electrode 13 includes a negative electrode active material and an supplementary electric conducting additive, for example. The negative electrode 13 has a sheet-like shape having a predetermined thickness t2.

The negative electrode active material is a negative electrode material capable of accumulating and releasing a substance (ions) being transferred between the positive electrode 12 and the negative electrode 13 during the electrode reaction. Examples of negative electrode active materials include graphite, non-graphitizable carbon, amorphous carbon, a polymer compound sintered body (obtained by sintering and carbonizing phenol resin or furan resin, for example), cokes (such as pitch coke, needle coke, and petroleum coke), carbon fiber, an electrically conductive polymer (such as polyacetylene and polypyrrole), tin, silicon, a metal alloy (such as a lithium-tin alloy, a lithium-silicon alloy, a lithium-aluminum alloy, and a lithium-aluminum-manganese alloy), and a composite oxide of lithium and transition metal (such as $Ti_4Ti_5O_{12}$).

The thickness t1 of the positive electrode 12 and the thickness t2 of the negative electrode 13 are each preferably set in a range of 150 μm to 1500 μm. The increased thickness of the positive electrode 12 and the negative electrode 13 enables a large amount of the active materials to be included in the secondary battery to lead to a larger capacity of the secondary battery, so as to improve the energy density.

The positive electrode active material and the negative electrode active material are not limited to the materials described above. The respective active materials used may be any material used for typical secondary batteries.

(Other Members)

The power generation element 10 includes a sealing member 18 in contact with the circumferential edge of the respective current collectors 11. The sealing member 18 is formed from an insulating sealing material. The sealing member 18 is fixed to the edges at the circumference of the respective current collectors 11, and is interposed between the adjacent two separators 15. The sealing member 18 prevents the contact between the collectors 11 adjacent to each other in the power generation element 10, and avoids a short circuit derived from slight unevenness of the edges of the single cell layers 14b.

The exterior body 20 covers and seals both sides of the power generation element 10 to house the power generation element 10. The exterior body 20 is a laminated film having a three-layer structure of resin-aluminum-resin.

The power generation element 10 according to the present embodiment having the structure as described above can ensure accumulated energy of 200 Wh or higher when fully charged. The accumulated energy during the full charge is the product of a discharge capacity (Ah) and an average discharge voltage (V). The accumulated energy of the secondary battery 1 during the full charge can be regulated by changing the areas of the positive electrode 12 and the negative electrode 13, or adjusting the stacked number of the single cell layers 14b. The accumulated energy may also be regulated by adjusting the amount or type (material) of the respective electrode active materials in the secondary battery.

(Operation)

The operation of the secondary battery 1 according to the embodiment is described below. The present embodiment is illustrated with a case in which the electrical conductor penetrates the secondary battery 1.

Figure 2:
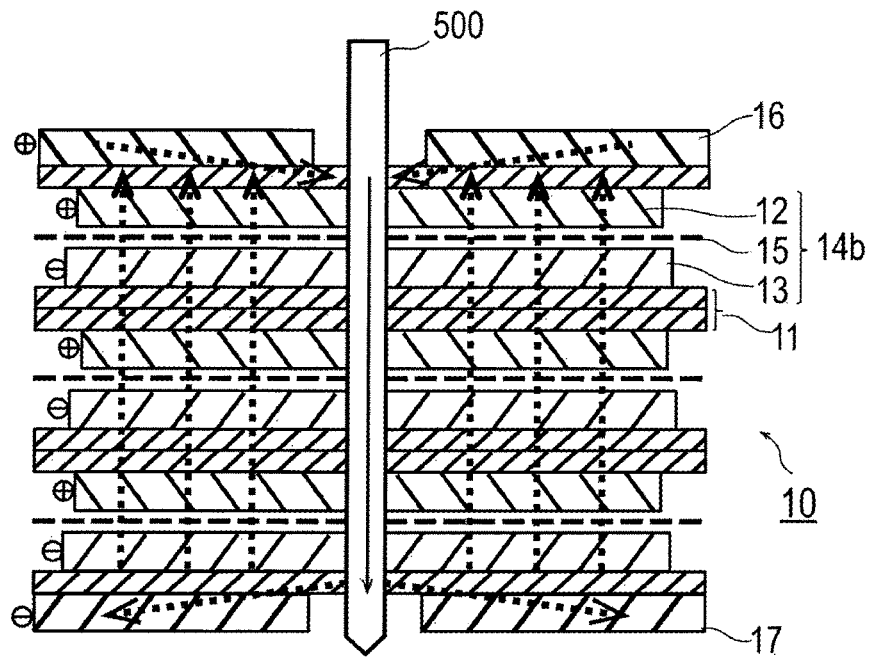
FIG. 2 is an explanatory view showing a state in which an electrical conductor penetrates the secondary battery according to the embodiment.
Figure 3:
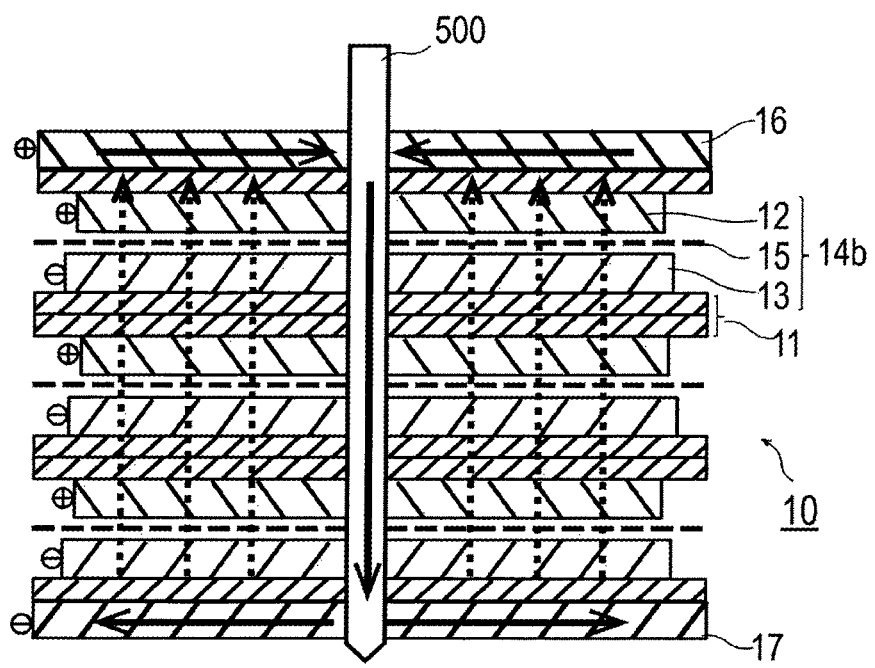
FIG. 3 is an explanatory view showing a state in which an electrical conductor penetrates a secondary battery of a comparative example.

FIG. 2 is a view for explaining the operation of the secondary battery 1 according to the embodiment. FIG. 3 is a view, as a comparative example, for explaining a state in which an electrical conductor penetrates a secondary battery including current collecting plates composed only of metal. The secondary battery of the comparative example has the same configuration as the secondary battery according to the present embodiment, except for the current collecting plates composed only of metal and the thermal shrinkage temperature of the separators. The arrows with the solid lines shown in FIG. 2 and FIG. 3 indicate a flow of current, and the arrows with the dotted lines indicate a flow of current caused by the movement of ions.

When the electrical conductor 500 penetrates the exterior body 20 to enter the secondary battery 1 according to the present embodiment, the electrical conductor 500 comes into contact with the positive electrodes 12, the negative electrodes 13, and the respective current collecting plates 16 and 17. Such penetration allows a short-circuit current to flow through the electrical conductor 500. The short-circuit current causes Joule heating to generate heat in the power generation element 10 and the electrical conductor 500.

The respective current collecting plates 16 and 17 then thermally shrinks due to the heat generation of the electrical conductor 500 when the circumferential temperature is 150° C. or higher. The thermal shrinkage causes the electrical conductor 500 to be separated from the respective current collecting plates 16 and 17, as shown in FIG. 2. The separators 15 hardly shrinks since the thermal shrinkage temperature is higher for the separators 15 than for the resin films 30 of the current collecting plates 16 and 17.

The current thus barely flows under such a situation (indicated by the arrow with the thin solid line), since the electrical conductor 500 is separated from the respective current collecting plates 16 and 17. The generated heat of the electrical conductor 500 is thus reduced. While the films of the separators 15 are also cut off by the electrical conductor 500, the separators 15 do not receive further thermal damage since the increase in temperature of the electrical conductor 500 is suppressed. The spread of the internal short circuit in the power generation element 10 derived from the thermal damage of the separators 15 thus can be avoided, so as to suppress the generated heat inside the power generation element 10 accordingly.

As shown in FIG. 3, when the electrical conductor 500 penetrates the exterior body 20 to enter the secondary battery of the comparative example, a current is allowed to flow through the electrical conductor 500 and the power generation element 10 to generate heat. The respective current collecting plates of the comparative example are each a single layer composed of metal, and thus hardly shrinks. The current then keeps flowing (indicated by the arrows with the thick solid lines) because the electrical conductor 500 and the current collecting plates remain in contact with each other. This condition keeps generating heat to increase the temperature and cause the separators 15 to be thermally damaged, which allows the short-circuit current to keep flowing to further increase the temperature inside the secondary battery.

Examples

Examples of the present invention are described below.

Secondary batteries having the following configurations were manufactured for Examples and Comparative Examples so as to be subjected to a nail penetration test and a discharge rate test for measuring a capacity retention rate. The nail penetration test is performed to presume a case in which the electrical conductor penetrates the exterior body and is stuck in the power generation element of the secondary battery.

Examples (Specifications of Single Cell)

Positive electrode active material: $LiNi_{0.8}Co_{0.15}Al_{0.05}$ (NCA)

Negative electrode active material: hard carbon (HC)

Separator: aramid separator

Electrolysis solution: 1M $LiPF_6$ EC/PC (1/1)

Current collector: carbon filler-added polypropylene (PP) foil

Bonding and sealing the circumference of the positive and negative electrode current collectors via an insulating sealing member Cell capacity: 1.5 Ah The current collectors were resin current collectors prepared as follows: polypropylene, acetylene black, and a dispersant were melted and kneaded with a pelletizer under the conditions of 180° C., 100 rpm, and a duration time of 10 minutes, so as to obtain pellets for the resin current collectors. The pellets for the resin current collectors were formed into a resin layer having a film thickness of 100 μm with an extrusion molding apparatus. The resin current collectors having a thermal shrinkage percentage of 4.3% at 150° C. were thus prepared.

(Specifications of Power Generation Element Including Stacked Single Cells)

The number of single cells stacked: three layers (in series)

Current collecting plate: resin film provided with Cu layer as electrically conductive layer (resin film: PP or PE; Cu layer: 0.5 μm; Cu layer being formed by plating)

including the three single cells stacked together so as to seal the entire body with a laminated film Comparative Examples (Specifications of Single Cell)
The same as Examples except for the separators
Separator: aramid separator or polypropylene (PP) separator Discharging condition: 0.1 C (0.15 A) or 1 C (1.5 A) CC 7.5 V cutoff
Capacity retention rate (%): 1 C discharge capacity (Ah)/ 0.1 C discharge capacity (Ah)

[Test Result]
Table 1 lists the specifications, physical properties, and the results of the nail penetration test and the discharge rate test for the current collecting plates and the separators of Examples and Comparative Examples.

TABLE 1

| | Specifications of current collecting plate | | Physical properties of current collecting plate | | | Thermal | | |
|---|---|---|---|---|---|---|---|---|
| | Substrate film | Material of electrically conductive layer/thickness (μm) | Thermal shrinkage percentage (% @150° C.) | Sheet resistance (Ω/sq) | Thermal shrinkage start temperature (° C.) | Specifications of separator | shrinkage start temperature of separator (° C.) | Nail penetration test result (@12.6 V, 25° C.) | Rate test capacity retention rate (% @1 C/ 0.1 C) |
| Example 1 | PP | Cu 0.5 | 2 | 0.1 | 110 | Aramid | >300 | OK | 89 |
| Example 2 | PE | Cu 0.5 | >50 | 0.1 | 90 | Aramid | >300 | OK | 89 |
| Comparative Example 1 | Single Cu | — | 0 | 0.001 | — | Aramid | >300 | NG | 90 |
| Comparative Example 2 | PP + epoxy | Cu 0.5 | 1 | 0.1 | 120 | Aramid | >300 | NG | 88 |
| Comparative Example 3 | PI | Cu 0.5 | 0 | 0.1 | >300 | Aramid | >300 | NG | 89 |
| Comparative Example 4 | PP | Cu 0.1 | 2 | 1.0 | 110 | Aramid | >300 | OK | 72 |
| Comparative Example 5 | PP | Cu 0.5 | 2 | 1.0 | 110 | PP | 100 | NG | 89 |

(Specifications of Power Generation Element Including Stacked Single Cells)
The same as Examples except for the current collecting plates
Current collecting plate: single Cu foil, or resin film provided with Cu layer (resin film: PP+epoxy, polyimide (PI), or PP; Cu layer: 0.1 μm or 0.5 μm; Cu layer being formed by plating)

[Evaluation Method]
(Evaluation of Physical Properties)
Measurement of thermal shrinkage percentage: leaving the resin film used for the current collecting plates at 150° for one hour to measure a change in dimension
Measurement of thermal shrinkage start temperature: measuring the resin film used for the current collecting plates by thermomechanical analyzer (TMA)
Measurement of sheet resistance: measuring the current collecting plates by four point prove method (measuring the Cu surface when providing the resin film with the Cu layer)

(Nail Penetration Test)
Cell voltage: 12.6 V
Nail: SUS 304/φ3 mm
Nail penetration speed: 80 mm/sec
External temperature: 25° C.
Determination criteria: battery surface temperature of lower than 150° C.→OK, battery surface temperature of 150° C. or higher→NG; the temperature being measured in the middle of the battery surface (Discharge Rate Test)
Charging condition: 1 C (1.5 A)/12.6 V CC/CV 1/20 C cutoff As the substrate film, PP was used in Example 1, and PE was used in Example 2. The respective resin films were provided with the Cu layers to serve as the current collecting plates. The respective separators used were an aramid separator.

The results of the nail penetration test in Examples 1 and 2 revealed that the thermal shrinkage of the current collecting plates was large during the heat generation due to the short circuit caused by the nail, so as to sufficiently reduce the short-circuit current caused by the nail. The results also revealed that the thermal shrinkage start temperature of the separators was high, so as to prevent the internal short circuit in the cells caused by the thermal damage of the separators after the thermal shrinkage of the current collecting plates. The high thermal resistance of the separators can prevent the internal short circuit in the cells caused by the thermal damage of the separators before the thermal shrinkage of the current collecting plates.

The results of the rate test in Examples 1 and 2 revealed that the sheet resistance was substantially the same as that in Comparative Example 1 using the current collecting plates including the single Cu foil, so as to suppress a decrease in the discharge rate property.

The single Cu foil was used as the current collecting plate in Comparative Example 1, and the respective separators used were an aramid separator. The sheet resistance of the current collecting plates was thus low. The results of the nail penetration test revealed that the short-circuit current was large because of less thermal shrinkage of the current collecting plates, resulting in NG in the nail penetration test.

The substrate film including the epoxy film stacked on the PP film and further provided with the Cu layer, was used as the current collecting plate in Comparative Example 2. The respective separators used were an aramid separator. The PI film provided with the Cu layer was used as the current collecting plate in Comparative Example 3. The respective separators used were an aramid separator. The results in Comparative Examples 2 and 3 revealed that the thermal shrinkage percentage of the current collecting plates was small, and the separation between the nail and the current collecting plates was insufficient after the nail penetration, resulting in NG in the nail penetration test.

The PP film provided with the Cu layer was used as the current collecting plate in Comparative Example 4. The respective separators used were an aramid separator. In Comparative Example 4, the Cu layer was thin, and the sheet resistance was high as the current collecting plate. The results revealed that the discharge rate property (the capacity retention rate) was lower than Examples 1 and 2 and the other comparative examples.

The PP film provided with the Cu layer was used as the current collecting plate in Comparative Example 5. The respective separators used were a PP film. In Comparative Example 5, the thermal shrinkage start temperature of the separators was low. The results revealed that the thermal damage inside the power generation element was increased before or substantially simultaneously with the thermal shrinkage of the current collecting plates after the nail penetration to cause the internal short circuit, resulting in NG in the nail penetration test.

The tests performed on Examples and Comparative Examples revealed that the use of the current collecting plates in which the resin film is provided with the Cu layer can avoid an increase in temperature during the nail penetration test. The tests also revealed that the current collecting plates having the sheet resistance of about 0.1 Ω/sq can ensure the capacity retention rate which is substantially the same as the current collecting plates using the single Cu foil.

The embodiment (including Examples) described above can achieve the effects described below.

(1) The secondary battery according to the present embodiment uses the current collecting plates each including the electrically conductive layer and the resin film, the electrically conductive layer being arranged on the resin film with the thermal shrinkage percentage of 2% or greater at 150° C. The resin films thermally shrinks or melted if the electrical conductor penetrates the exterior body to enter the secondary battery to generate heat, so that the current collecting plates are divided at the parts brought into contact with the electrical conductor. The amount of the current flowing through the electrical conductor via the current collecting plates is thus decreased, reducing the heat generation of the electrical conductor. The present embodiment uses the separators having a higher thermal shrinkage start temperature than the resin films used for the current collecting plates. The separators thus receive less or no thermal damage at the point when the resin films of the current collecting plates thermally shrinks or melted. Since the heat generation in the electrical conductor or the current collecting plates is reduced after the point when the resin films of the current collecting plates thermally shrinks or melted, as described above, the spread of the internal short circuit caused by the thermal damage of the separators can be avoided. The increase in temperature in the secondary battery can be avoided accordingly if the electrical conductor penetrates the secondary battery.

(2) The present embodiment uses the metal layer as the respective electrically conductive layers on the resin films. The electrically conductive layers having low resistance thus can be provided on the resin films.

(3) The present embodiment sets the resistance of the current collecting plates to 0.1 Ω/sq or less. The capacity retention rate thus can be set to be as high as the secondary battery using the current collecting plates composed only of metal.

(4) The present embodiment uses the current collectors preferably formed from electrically conductive resin. The use of the electrically conductive resin increases the electrical resistance in the plane direction with no influence on the electronic conduction in the stacked direction. The amount of the current flowing through the electrical conductor via the current collectors thus can be decreased if the electrical conductor penetrates the exterior body to enter the power generation element.

While the secondary battery according to the embodiment of the present invention has been described above, it should be understood that the present invention is not intended to be limited to the above embodiment, and various modifications can be made according to the appended claims within the scope of the present invention.

This application is based upon and claims the benefit of priority from Japanese Patent Application No. 2017-094061, filed on May 10, 2017, the entire contents of which are incorporated herein by reference.

REFERENCE SIGNS LIST

1 SECONDARY BATTERY
10 POWER GENERATION ELEMENT
11 CURRENT COLLECTOR
12 POSITIVE ELECTRODE
13 NEGATIVE ELECTRODE
14a BIPOLAR ELECTRODE
14b SINGLE CELL LAYER
15 SEPARATOR
16 POSITIVE-ELECTRODE-SIDE CURRENT COLLECTING PLATE
17 NEGATIVE-ELECTRODE-SIDE CURRENT COLLECTING PLATE
18 SEALING MEMBER
20 EXTERIOR BODY
30 RESIN FILM
31 ELECTRICALLY CONDUCTIVE LAYER

The invention claimed is:

1. A bipolar secondary battery including bipolar electrodes, the bipolar secondary battery comprising:
   a power generation element including unit power generation elements stacked together and including the bipolar electrodes stacked via separators; and
   current collecting plates arranged only on both of outermost layers of the power generation element in a stacked direction of the unit power generation elements so as to be in contact with the power generation element; and
   an exterior body housing the power generation element,
   each of the current collecting plates including an electrically conductive layer and a resin film, the electrically conductive layer being formed on the resin film having a thermal shrinkage percentage of 2% or greater at a temperature of 150° C.,
   each of the separators having a higher thermal shrinkage start temperature than the resin film, and
   each of the current collecting plates being led out of the exterior body.

2. The bipolar secondary battery according to claim 1, wherein the electrically conductive layer formed on the resin film is a metal layer.

3. The bipolar secondary battery according to claim 1, wherein a sheet resistance of the respective current collecting plates including the electrically conductive layer formed on the resin film is 0.1 Ω/sq or less.

4. The bipolar secondary battery according to claim 1, wherein the bipolar electrodes are each provided with a positive electrode on one surface of a resin current collector, and a negative electrode on another surface opposite to the one surface.

5. The bipolar secondary battery according to claim 1, wherein the resin film of each of the current collecting plates is led out of the exterior body.

\* \* \* \* \*